United States Patent [19]

Maki et al.

[11] Patent Number: 5,539,874
[45] Date of Patent: Jul. 23, 1996

[54] CACHE MEMORY DEVICE FOR STORING IMAGE DATA

[75] Inventors: Kazuhiko Maki; Eiji Komoto, both of Tokyo, Japan

[73] Assignee: Oki Electric Industry Co., Ltd., Tokyo, Japan

[21] Appl. No.: 529,707

[22] Filed: Sep. 18, 1995

Related U.S. Application Data

[63] Continuation of Ser. No. 960,458, filed as PCT/JP92/00471, Apr. 14, 1992, published as WO92/18945, Oct. 29, 1992, abandoned.

[30] Foreign Application Priority Data

Apr. 15, 1991 [JP] Japan ............................ 3-082710

[51] Int. Cl.⁶ .................................................. G06F 12/06
[52] U.S. Cl. ........................................ 395/166; 395/164
[58] Field of Search .................................. 395/162, 164, 395/166

[56] References Cited

U.S. PATENT DOCUMENTS

| | | | |
|---|---|---|---|
| 4,876,651 | 10/1989 | Dawson et al. | 364/449 |
| 5,185,856 | 2/1993 | Alcorn et al. | 395/130 |
| 5,297,270 | 3/1994 | Olson | 395/425 |
| 5,321,816 | 6/1994 | Rogan et al. | 395/200 |

FOREIGN PATENT DOCUMENTS

| | | | |
|---|---|---|---|
| 239269 | 3/1987 | European Pat. Off. | G06F 15/64 |
| 63-239542 | 10/1988 | Japan | G06F 12/00 |
| 2-110676 | 4/1990 | Japan | G06F 15/64 |
| 3-154977 | 7/1990 | Japan | G06F 15/64 |

OTHER PUBLICATIONS

Volkers, E. A., Cache Memory Design For The Data Transport to Array Processor, IEEE International Symposium On Circuits And Systems, May 1, 1990, pp. 49–52.
Stone, Harold S., High Performance Computer Architecture, pp. 31–42 (Japanese article, and English translation).

*Primary Examiner*—Raymond J. Bayerl
*Assistant Examiner*—U. Challhan
*Attorney, Agent, or Firm*—Edward D. Manzo; Mark J. Murphy

[57] ABSTRACT

A cache memory device stores image data which are arranged corresponding to address data having first and second two-dimensional coordinate data. The image data are divided into a plurality of first groups in accordance with the first two-dimensional coordinate data, with the first groups further divided into a plurality of second groups in accordance with the second two-dimensional coordinate data. The cache memory device includes an image data memory for storing a given image data therein, which is divided into a plurality of block areas arranged in two dimensions. The reading and writing of image data from and to the image data memory is controlled by a central processing unit. A cache storage, comprising a cache memory, an address data decoding circuit, an address matching circuit and a control circuit, is coupled between the image data memory and the central processing unit by way of buses.

8 Claims, 5 Drawing Sheets

```
       64 bit
      ┌──────┐
 8bit │<0 0> │<0 1>│<0 2>│<0 3>┐
      ├──────┼─────┼─────┼─────┤
      │<1 0> │<1 1>│<1 2>│<1 3>│── 301
      ├──────┼─────┼─────┼─────┤
      │<2 0> │<2 1>│<2 2>│<2 3>│
      ├──────┼─────┼─────┼─────┤
      │<3 0> │<3 1>│<3 2>│<3 3>│
      └──────┴─────┴─────┴─────┘
```

| [0000] | [0001] | ------ | [0007] |
|--------|--------|--------|--------|
| [0100] | [0101] |        | [0107] |
| ⋮      | ⋮      |        | ⋮      |
| [3200] | [3201] | -----  | [3207] |

CACHE MEMORY DEVICE FOR STORING IMAGE DATA

This is a continuation of application Ser. No. 07/960,458 filed on Dec. 15, 1992, now abandoned which was based upon international application PCT/JP92/00471, filed Apr. 14, 1992.

TECHNICAL FIELD

The present invention relates to an image processing device for carrying out image processing at high speed using a cache memory device of small capacity provided between a central processing unit (hereinafter referred to CPU) and an image data memory.

BACKGROUND TECHNOLOGY

A conventional image processing device has a structure as illustrated in FIG. 2. It complexes a CPU 1 and an image data memory 2 which are connected to each other by way of an address bus 3 and a data bus 4.

The CPU 1 supplies address data to the image data memory 2 by way of the address bus 3, and reads the image data from and writes the image data in the image data memory 2 (hereinafter referred to "access") by way of the data bus 4. As a result, an image data is generated. In case of accessing a target image data, it must be accessed in the image data memory 2 every time the CPU 1 operates the image data. That is, the CPU1 has to repeat the operation of reading the image data from the image data memory 2 to subject the image data to operation and thereafter writing the image data in the image data memory 2 as many times as the number of the image data.

For example, suppose that a letter "V" is subjected to operation for writing the same on a letter "A" in an example of writing image data as illustrated in FIG. 3. If both of the letters "A" and "V" are composed of the data of 32 bits×32 words (1 word having 32 bits) and the CPU 1 has the bandwidth of 32 bits, drawing the letters "A" and "V" requires 32 times of reading operation and 32 times of writing operation respectively. Consequently, 128 times of accessing the image data memory 2 are required in total. Therefore, it takes much time in image processing (hereinafter referred to access time).

There is an image processing device designed to expedite the image processing for reducing the frequency of accessing the image data memory 2 as illustrated in FIG. 4.

The image processing device comprises a CPU 11, an image data memory 12 and a cache storage 13 which is provided between the former two. Furthermore, the CPU 11 and the cache storage 13 are coupled to each other by way of an address bus 14 and a data bus 15, while the image data memory 12 and the cache storage 13 are coupled to each other by way of an address bus 16 and a data bus 17. The image data memory 12 is composed of a plurality of block areas B0 to B9, while the cache storage 13 is composed of a plurality of entry areas E0 to E4. A technique relating to the cache storage is disclosed in pp.31 to 42 in "High Quality Computer Architecture" authored by Tadao Saito and Hiroshi Hatta, published by Maruzen Co. Ltd.

The CPU 11 supplies address data to the cache storage 13 by way of the address bus 14 and receives image data from the cache storage 13 and supplies the same thereto by way of the data bus 15. Moreover, the cache storage 13 supplies the address data to the image data memory 12 by way of the address bus 16 and receives the image data therefrom and supplies the same thereto by way of the data bus 17.

An operation of the thus constructed image processing device in accessing the image data will be described hereinafter.

If there is no image data required by the CPU 11 in the cache storage 13, the cache storage 13 reads out the image data from the data memory 12 and supplies the read image to the CPU 11. For example, the cache storage 13 caches the target image data of the letter "A" which is stored in blocks B3 to B6 of the image data memory 12 in the entry areas E1 to E4 of the cache storage 13 as illustrated in FIG. 4. If the cache storage 13 has the necessary image data therein, accessing the image data is performed only between the CPU 11 and the cache storage 13.

Furthermore, the cache storage 13 renews the image data in the image data memory 12 in a batch when the image data in the image data memory 12 need to be renewed so that the CPU 11 does not directly take part in it. Accordingly, the image data in the image data memory 12 can be renewed by reading the same therefrom and writing the same therein only once even if the image data are accessed a plurality of times.

In this way, the image data processing device has an advantage of processing the image at high speed since the CPU 11 accesses only the cache storage 13 which can be accessed faster compared with the image data memory 12.

In this image data processing device, however, the cache storage 13 accesses not only the target image data, but also unnecessary data in the same entry area together with it since it accesses by the entry area. As a result, there is a problem that it takes much access time due to unnecessary access.

Furthermore, there is another problem that the presence of the unnecessary data in the cache storage 13 reduces the hit rate of the requested data cached therein (the probability of finding the requested data in the cache storage 13) so that the access efficiency is reduced.

Therefore, a measure for erasing the unnecessary areas can be considered by dividing the entry areas of the cache storage 13 into smaller ones in order to eliminate the unnecessary areas, however, it is not a sufficient measure since the memories for storing the tags of the entry areas therein (i.e., indexes for each entry area address) are increased, so that the components of the device as a whole are increased in number.

It is the object of the present invention to provide an image processing device solving such problems of the prior art set forth above that it takes much access time and the access efficiency is reduced.

DISCLOSURE OF THE INVENTION

In order to solve the problems set forth above, the image processing device according to the present invention is characterized in comprising:

an image data memory for storing a given image data therein, the image data memory being divided into a plurality of block areas arranged in two dimensions;

a central processing unit for reading the given image data from and writing the same in the image data memory;

a cache storage provided between the image data memory and the central processing unit, the cache storage being coupled to the image data memory and the central processing unit by way of buses respectively; wherein the cache storage comprises;

a cache memory which can store therein data having the same capacity as that of a block area in said image data memory, and which is divided into a plurality of entry areas arranged in two dimensions, wherein the data stored in each of the entry areas is an image data at the position corresponding to each block area of the image data memory; and an address data decoding circuit for decoding the address data supplied from said central processing unit by way of one of the buses so as to generate the address of the necessary image data in the image data memory and locating the entry area in the cache memory corresponding to the address of the necessary image data in said image data memory which area is for storing the necessary image data therein.

BRIEF DESCRIPTION OF THE DRAWINGS

FIG. 6 is a view showing an arrangement of an image data in the image data memory, FIG. 7 is a view showing an arrangement of an image data in a cache memory.

BEST MODE FOR CARRYING OUT THE INVENTION

Figure 1:
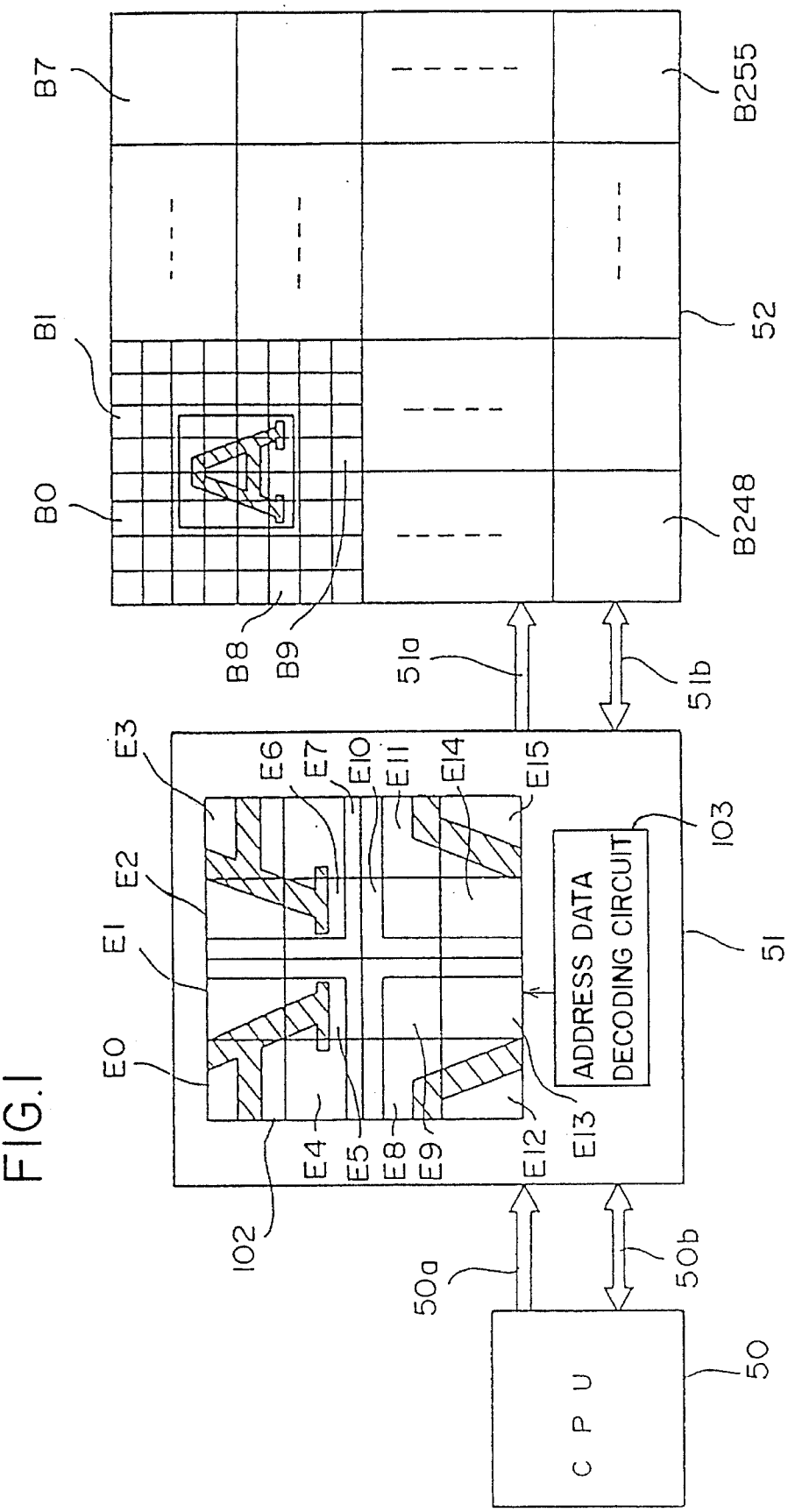
FIG. 1 is a schematic view showing a structure of an image processing device according to an embodiment of the present invention.
Figure 2:
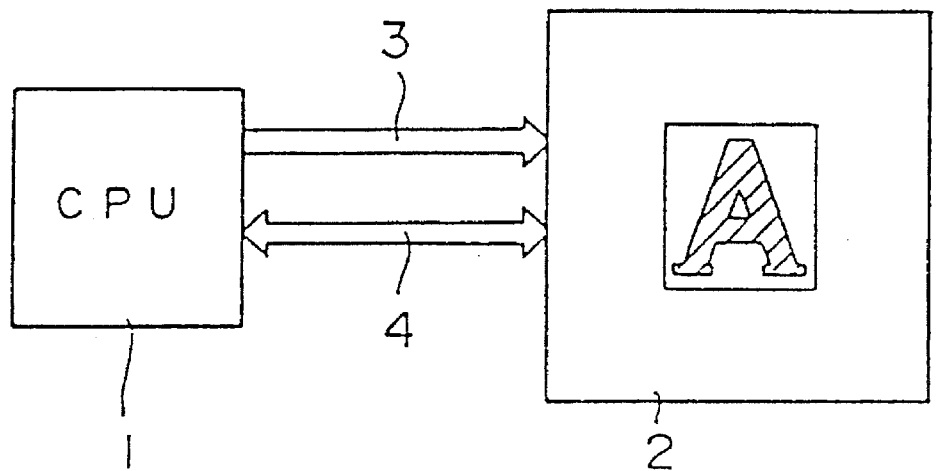
FIG. 2 is a schematic view showing a structure of a conventional image processing device.
Figure 3:
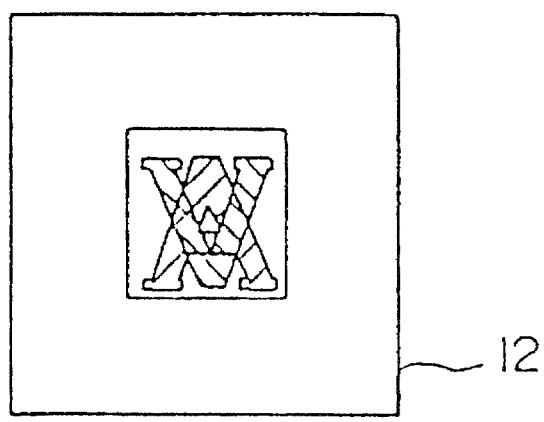
FIG. 3 is a view exemplifying writing an image data in an image data memory.
Figure 4:
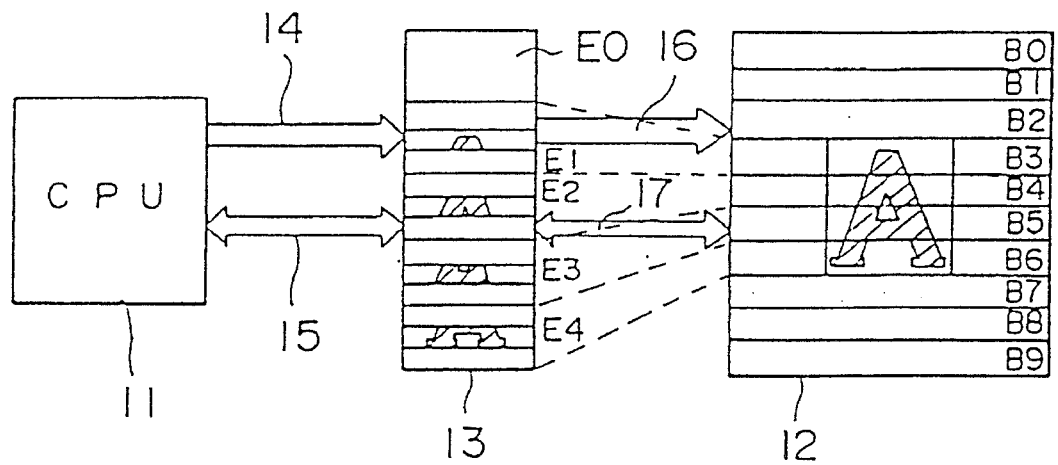
FIG. 4 is a schematic view showing a structure of another conventional image processing device.

FIG. 1 is a schematic view showing an image processing device according to an embodiment of the present invention.

The image processing device comprises a CPU 50 for carrying out processing etc. so as to control the operation of the device as a whole. The CPU 50 is coupled to a high-speed accessing cache storage 51 by way of an address bus 50a and a data bus 50b. The cache storage 51 is further coupled to a low-speed accessing image data memory 52 by way of an address bus 51a and a data bus 51b. In general, the access time of the cache storage 51 is ¼ to ½₀ times as long as that of the image data memory 52.

The cache storage 51 includes, for example, 16 entry areas E0 to E15 which are arranged in a two-dimensional array for storing the image data therein. Each of the two-dimensionally strayed entry areas E0 to E15 has a construction in which an image data which is continuous both in row and in column corresponds to an entry area.

Whereas the image data memory 52 composed of RAMs (random access memories) is divided into, for instance, 256 blocks of memory areas B0 to B255.

An operation of the thus constructed image processing device will be described hereinafter.

When the CPU 50 needs an image data, the CPU 50 supplies the address data corresponding to the image data to the cache storage 51 by way of the address bus 50a. The cache storage 51 investigate whether it has therein the image data corresponding to the given address data or not.

When the cache storage 51 has the corresponding image data therein, the CPU 50 receives the image data read out from the cache storage 51 by way of the data bus 50b. When the CPU 50 writes the image data in the cache storage 51 after processing the same therein, the CPU 50 supplies the address of the image data to the cache storage 51 by way of the address bus 50a and at the same time supplies the image data to be written to the cache storage 51 by way of the data bus 50b.

When the cache storage 51 has not the corresponding image data therein, the cache storage 51 supplies the address which has been supplied by the CPU 50 to the image data memory 52 by way of the address bus 51a. As a result, the necessary image data is read out from the image data memory 52, and the thus read image data is supplied to the cache storage 51 by way of the data bus 51b.

When the image data is written in the image data memory 52, the CPU 50 supplies the address to the image data memory 52 by way of the address bus 51a and supplies the image data to the image data memory 52 so as to write the same therein by way of the data bus 51b.

Accessing and processing the image data are performed in this way by the CPU 50, the cache storage 51 and the image data memory 52.

Whereupon, as described above, the cache storage 51 includes, for example, 16 entry areas E0 to E15 for storing an image therein in two-dimensional array as illustrated in FIG. 1. So, when an image data in the image data memory 52 is read out to the cache storage 51, the necessary image data in the necessary blocks (e.g., blocks B0, B1, B8, B9) of the blocks B0 to B255 in the image data memory 52 are read out into empty entry areas in the cache storage 51.

If there is no empty entry area in the cache storage 51, the content of an entry area therein is written in the image data memory 52 and thereafter the necessary image data is read out into the entry area according to a given algorithm (e.g., a first-in first-out algorithm)

In short, if the cache storage 51 has not the image data required by the CPU 50, the cache storage 51 reads out the image data from the image data memory 52 and supplies the same to the CPU 50. If the cache storage 51 has the image data, accessing the image data is performed only between the CPU 50 and the cache storage 51.

Furthermore, when the image data memory 52 is to be renewed, e.g., in response to an external request to read out the image data memory 52, the cache storage 51 renews the data memory 52 in a batch when necessary, so that the CPU 50 does not take part in the renewal. Accordingly, the image data can be renewed by reading the same from and writing the same in the image data memory 52 only once even if the image data are accessed a plurality of times.

When the CPU 50 needs the letter "A" (e.g., composed of data having 4 word width) in the blocks B0, B1, B8 and B9 of the image data memory 52 as illustrated in FIG. 1, the image data of the word "A" are cached from the blocks B0, B1, B8 and B9 into the corresponding entry areas in the cache storage 51. That is, the image data in B0 is read out into the entry areas E10, E11, E14 and E15, the image data in the block B1 is read out into the entry areas E8, E9, E12 and E13, the image data in the Block B8 is read out into the entry areas E2, E3, E6 and E7 and the image data in the block B9 is read out into the entry areas E0, E1, E4 and E5 respectively.

Each component in FIG. 1 will be described hereinafter more particularly.

Figure 5:
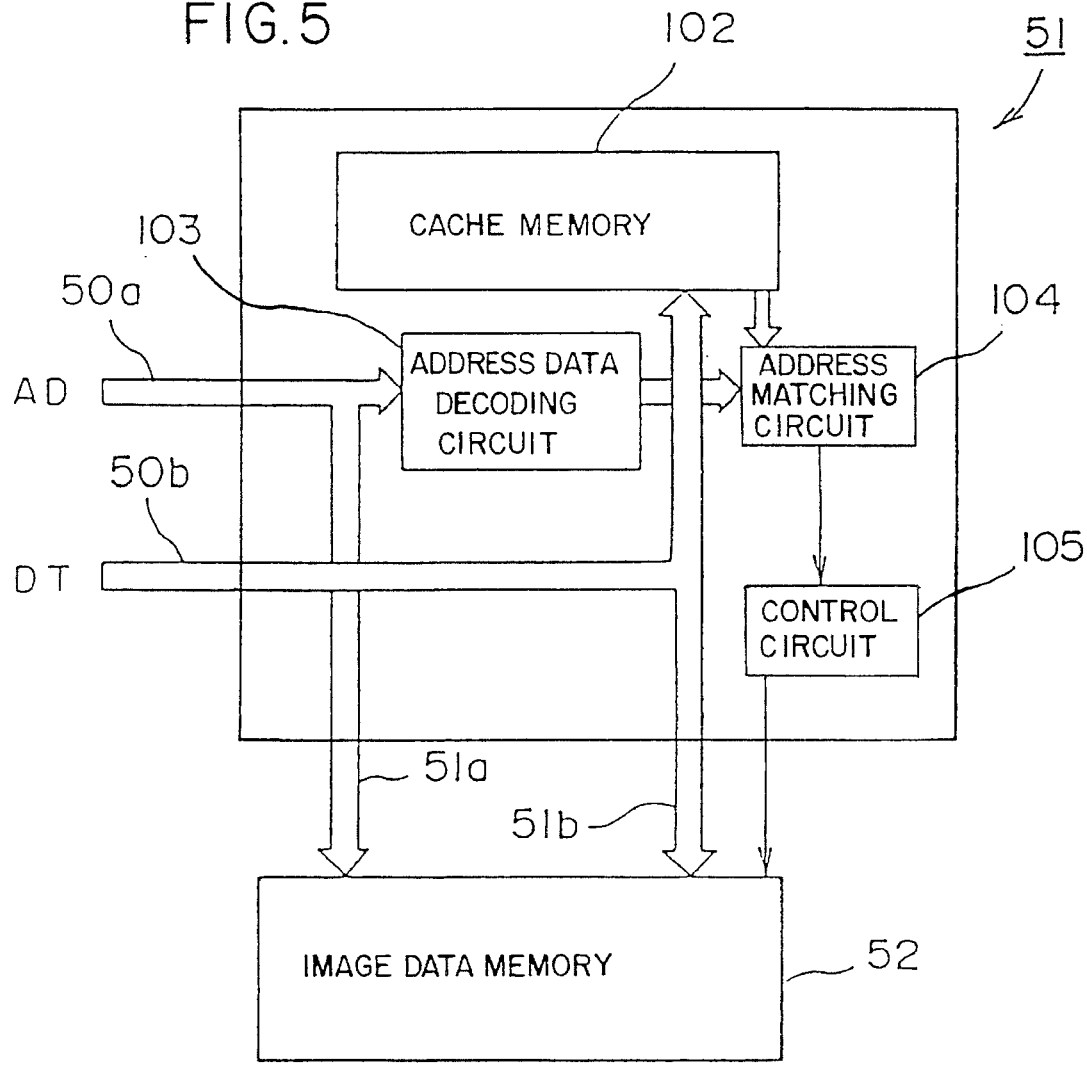
FIG. 5 is a block diagram showing a cache storage construction according to the present invention.

FIG. 5 is a circuit diagram showing a cache storage according to the present invention.

The cache storage 51 according to the present invention comprises a cache memory 102, an address data decoding circuit 103, an address matching circuit 104 and a control circuit 105.

The cache memory 102 stores therein given image data, e.g., those frequently used. The address data decoding circuit 103 receives the address data AD supplied by the CPU, decodes the address data AD so as to generate addresses corresponding to the entry areas in the cache memory 102, and supplies the generated addresses to the address matching circuit 104. The address matching circuit 104 detects whether the cache memory 102 has the corresponding image data therein or not on the bases of the decoded address data AD, and supplies the result to the control circuit 105. The control circuit 105 determines which of the cache memory 102 and the image data memory 52 should be accessed based on the output of the address matching circuit 104.

The arrangement of the image data in the image data memory 52 and the arrangement of entry areas of the cache memory 102 in the cache storage 51 will now be described.

Figures 6, 7:
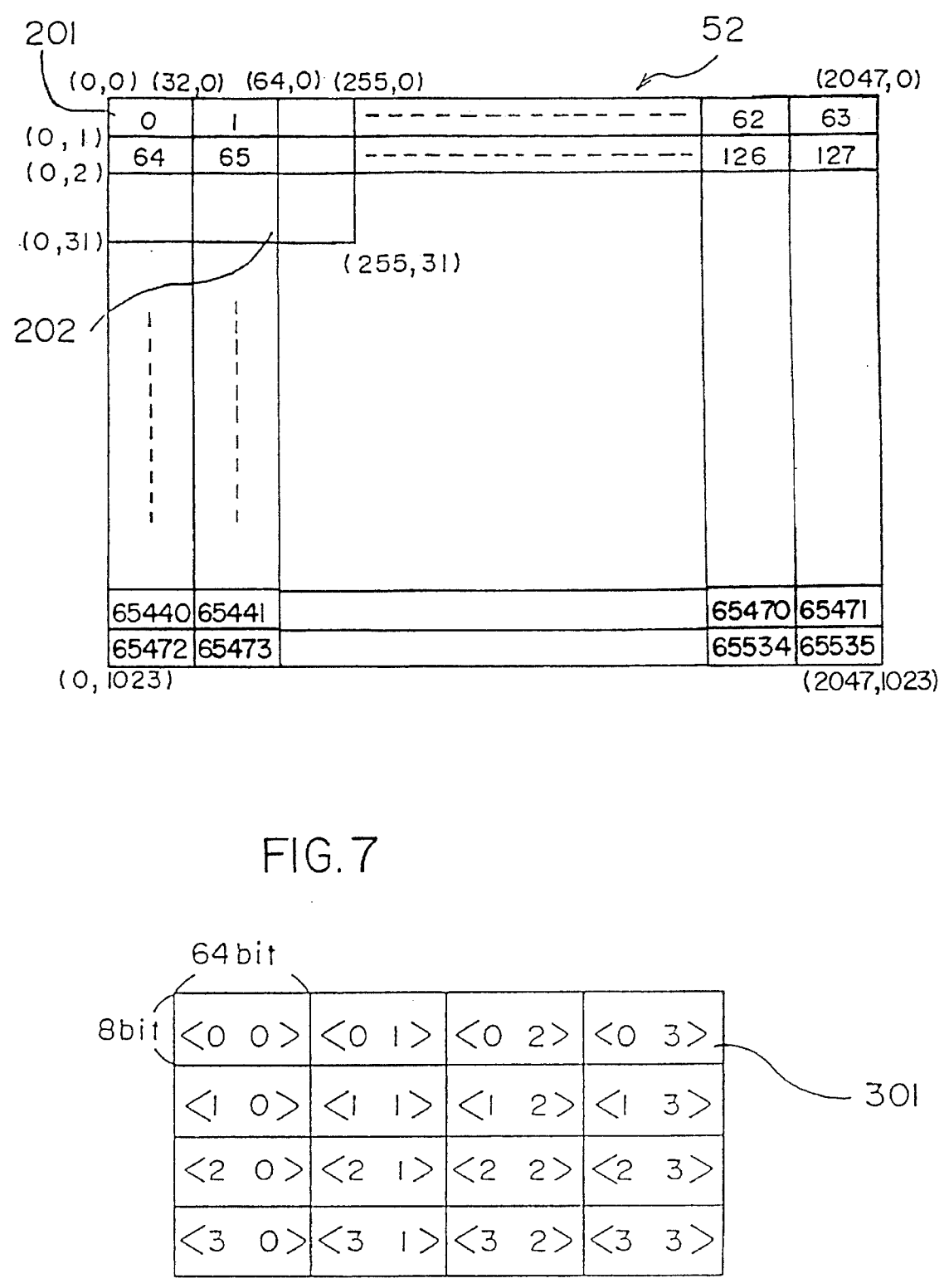

FIG. 6 shows the arrangement of image data in the image data memory 52. This figure exemplifies an image data memory 52 which can store therein an image data having 2048 dots in row and 1024 dots in column. That is, supposing that 1 dot corresponds to 1 bit and 1 word corresponds to 32 bits, the image data memory 52 can store therein image data having the capacity of 65536 words. Denoted at 201 is a word and numerals in words represent word numbers respectively. The numerals in ( ) represent the coordinates of each dot. Consequently, when the CPU 50 supplies the address data AD represented by the coordinates of each word, e.g., x-coordinate =32 and y-coordinate =0, word number 1 is selected.

FIG. 7 is a view showing an arrangement of each entry area in the cache memory 102 in the cache storage 52. In the figure, denoted at 301 is an entry area and the numeral in <> in each entry area is the entry number of each entry area. An entry area is as large as 64 bits in row and 8 bits in column. That is, an entry area corresponds to the image data of 16 words. This figure exemplifies the cache memory 102 capable of storing therein 16 entry areas. Denoted at 202 in FIG. 6 is a memory area having the capacity equal to that of the cache memory 102 for storing image data therein.

Decoding address data in the address data decoding circuit 103 will be described with reference to FIG. 8 hereinafter.

Figures 8, 9:
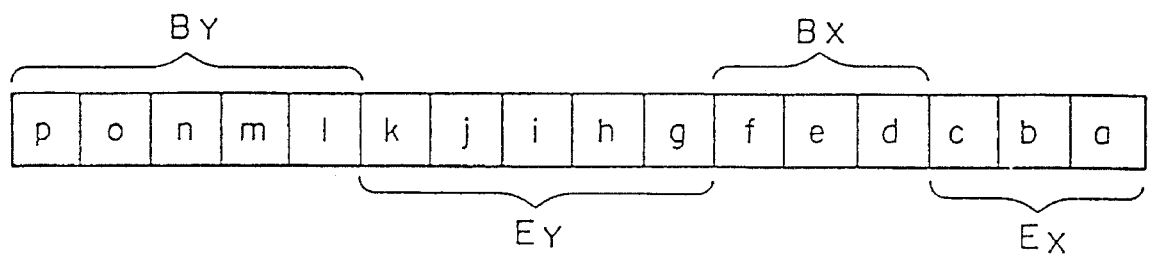
FIG. 8 is a view for explaining the decoding operation in an address decoding circuit in the cache storage.
FIG. 9 is a view for explaining the correspondence between the image data memory and the cache memory.

FIG. 8 shows an address data AD comprising a data of 16 bits.

The address data of 16 bits is exemplified here so that it may be able to designate all entry areas since the image data memory 52 can store the data of 65536 bits therein. As a result, a to f of the 16 bits represent a lateral coordinate, and g to p thereof represent a vertical coordinate according to this embodiment. Suppose that the address data AD is "0000000001000001", it represents the coordinates (1,1). The input address data AD is decoded to generate an entry number in the cache memory 102. The entry number is represented by two digits of the address data AD as illustrated in FIG. 7. The lower digit represents the lateral position, while the upper digit represents the vertical position. The lower digit of the entry number is represented by the b and c of the address data AD, while the upper digit of the entry number is represented by the j and k of the address data AD. Suppose that the address data AD is "0000000001000001", the entry number is <0 0>, and suppose that the address data AD is "0000010001000011", the entry number is <21>. The b, c and j, k of the address data AD are used for determining the entry number in order to designate 16 words in the same entry area, since an entry area is designed to include 16 words. That is, the a and g, h, i of the address data AD are used for further designating the position of word in the entry area of the determined entry number.

As described above, the $E_X$ and $E_Y$ of the address data AD are used for the cache memory 102 as illustrated in FIG. 8.

$B_X$ (d to f) and $B_y$ (1 to p) in FIG. 8 represent the blocks in the image data memory 52. The block means each area into which the image data memory storage 52 is divided so that it may contain image data which can be stored in the cache memory 51. The image data memory 52 is divided into 256 blocks according to this embodiment as illustrated in FIG. 9. In this figure, the numerals in [ ] are block numbers. The lower two digits of the block number correspond to $B_X$, while the upper two digits corresponds to $B_Y$. Suppose that the address data AD is "0000100001011001", $B_X$="011"(=3) and $B_Y$="001"(=1) are established so that the block number becomes [0301]. In this case, the entry number is <00>. The image data of each block having the same entry number are stored in the entry area in the cache memory 102 having the same entry number.

An operation of the thus constructed cache storage 51 will be described hereinafter.

In case of reading, the address data AD of the image data requested by the CPU 50 is supplied to the address data decoding circuit 103 at first. The address data decoding circuit 103 decodes the address data AD to generate the block number and the entry number. The block number and the entry number are supplied to the address matching circuit 104. The address matching circuit 104 investigates whether the necessary image data is stored in the cache memory 102 or not based on the block number and the entry number. If each image data in the cache memory 102 is indexed so as to indicate which block of the image data memory 52 it corresponds to, the address matching can be performed only by investigating in the entry area of the corresponding entry number. When the image data is matched by the address matching, i.e., the necessary image data is stored in the cache memory 102, the control circuit 105 instructs the CPU 50 to read out the image data from the cache memory 51. When the image data is not identified, i.e., the necessary image data is not stored in the cache memory 102, the control circuit 105 instructs the CPU 50 to read out the image data from the image data memory 52.

Writing the image data is performed in the same way as reading. It is also possible to store the image data, which is read out from or written in the image data memory 52, temporarily in the cache memory 102 when the image data is not identified therein in case of reading or writing the same.

As described above, this embodiment has the following advantages.

Inasmuch as each entry area of the cache storage 51 is arranged in a two-dimensional array so as to correspond to the image data memory, it is possible to access only minimum necessary data. As a result, when, for instance, the image data in the block B1 of the image data memory 52 in FIG. 1 is cached in an entry area of the cache storage 51, it is possible to access only necessary image data of necessary blocks without accessing unnecessary image data, and furthermore it is possible to also cache the image data stored in the same row which the CPU 50 will need in next access, so that the hit rate is enhanced.

The present invention is not limited to the embodiments illustrated above, but can be modified variously. For example, the following modifications can be achieved.

(a) Although the two-dimensional arrayed entry memory addresses are continuous in row and are arranged at a given interval in column, they can be continuous in column and be arranged at a given interval in row.

(b) The number of entry areas in the cache storage 51 and the number of blocks in the image data memory 52 are not limited to the embodiments set forth above.

(c) It is also possible to provide a plurality of cache memories 102 among which a suitable one can be selected.

(d) It is possible to further expedite the processing speed if the memory area is divided into entry areas each formed of a word since a high-speed transference of data such as the high-speed page mode of a dynamic RAM is available in the data transference between the image data storage 52 and the cache storage 51.

(e) Although the address data AD supplied to the address data decoding circuit 103 in the cache storage 51 includes the x-coordinate value and y-coordinate value therein, both values being incorporated in one (a data of 16 bits in this case) according to this embodiment, it is possible to process them in the same way as in this embodiment even if the x-coordinate value and the y-coordinate value are separately supplied to the address data decoding circuit 103. In this case, for example, if the address data decoding circuit 103 is informed that the first address data AD supplied thereto by the CPU 50 includes the x-coordinate values therein and the second address data AID supplied thereto by the CPU 50 includes the y-coordinate values therein, the address data decoding circuit 103 can decode the first address data AID to generate the $E_x$ and $B_x$ and thereafter decode the second address data AD to generate $E_Y$ and $B_Y$ when these data are alternately supplied thereto.

INDUSTRIAL UTILIZATION

As described in detail, inasmuch as the image processing device according to the present invention is provided with a cache storage having a plurality of entry areas designated by address data arranged in a two-dimensional array, each entry area stores only minimum necessary image data therein. As a result, accessing image data in unnecessary areas can be avoided so that the hit rate is increased and the access time is shortened, and furthermore it is possible to form the circuit with components which are fewer in number compared with conventional image processing devices.

We claim:

1. A cache memory device for storing image data which are arranged corresponding to an address data having first and second two-dimensional coordinate data on an x-axis direction and a y-axis direction, the image data being divided into a plurality of first groups in accordance with said first two-dimensional coordinate data, each of the image data divided into the first groups being further divided into a plurality of second groups in accordance with said second two-dimensional coordinate data, said cache memory device comprising:

an image data memory for storing said image data divided into the first groups;

a central processing unit for reading said image data from and writing said image data in said image data memory; and a cache storage coupled to said image data memory and said central processing unit via respective buses;

wherein said cache storage comprises:

a cache memory for storing a part of said image data divided into the second groups in accordance with said second two-dimensional coordinate data;

an address data decoding circuit for decoding said address data supplied from said central processing unit by way of one of said buses so as to detect the first and second two-dimensional coordinate data from the address data;

an address matching circuit for deciding whether the image data corresponding to said address data is stored in said cache memory or not in response to said first and second two-dimensional coordinate data detected by said address data decoding circuit; and a control circuit for selecting one of the image data memory or the cache memory so that the image data are read from or written into said one of the image data memory or the cache memory in response to said address data detected by said address data decoding circuit.

2. A cache memory device according to claim 1, wherein an entry number is assigned to each entry area of the cache memory which corresponds to each block area of the image data memory so as to locate a respective position of an entry area therein, and wherein said address data decoding circuit decodes said address data supplied from said central processing unit to generate the entry number.

3. A cache memory device according to claim 1, wherein a block number is assigned to each block area in said image data memory so as to locate a respective position of a block area therein while an entry number is assigned to each entry area in said cache memory so as to locate a respective position of an entry area therein so that said address data decoding circuit locates the block area in said image data memory in which a necessary image data is stored and the entry area in said cache memory by way of the block number and the entry number generated by decoding said address data.

4. A cache memory device according to claim 1, wherein said cache memory has a same capacity as one of said first groups.

5. An image processing device comprising:

an image data memory for storing a given image data therein, said image data memory being divided into a plurality of block areas arranged in two dimensions;

a central processing unit for reading said image data from and writing said image data in said image data memory; and a cache storage coupled between said image data memory and said central processing unit, said cache storage being coupled to said image data memory and said central processing unit by way of buses respectively;

wherein said cache storage comprises:

a cache memory for storing data having a same capacity as that of a block area in said image data memory, and which is divided into a plurality of entry areas arranged in two dimensions, wherein the data stored in each of said entry areas is an image data at a position corresponding to each block area of said image data memory;

an address data decoding circuit for decoding an address data supplied from said central processing unit by way of one of the buses so as to generate an address of a necessary image data in said image data memory and locating an entry area in said cache memory corresponding to the address of the necessary image data in said image data memory which area is for storing the necessary image data therein;

an address matching circuit for investigating whether the image data corresponding to said address data is stored in said cache memory or not by way of the block area and the entry area located by said address data decoding circuit; and a control circuit for determining which of the image data memory and cache memory should be selected for reading or writing the image data therein corresponding to a result of the investigation of said address matching circuit.

6. An image processing device according to claim 5, wherein a block number is assigned to each block area in said image data memory so as to locate a respective position of a block area therein while an entry number is assigned to each entry area in said cache memory so as to locate a respective position of an entry area therein, and said address data decoding circuit decodes said address data supplied from said central processing unit to generate the block number of the image data corresponding to the address data and the number of the entry area in which the image data corresponding to the address data is cached and said address matching circuit investigates data stored in said cache memory based on the generated block number and entry number.

7. An image processing method comprising the steps of:

locating an entry area in which a necessary image data is stored in a temporary image data storing portion divided into a plurality of entry areas arranged in two dimensions, said temporary image data storing portion storing therein a part of image data in an image data storing portion divided into a plurality of block areas arranged in two dimensions, before processing said image data in said image data storing portion based on an address when the address of said necessary image data in said image data storing portion is designated;

investigating whether said necessary image data is stored in said temporary image data storing portion or not based on a located entry area;

processing said necessary image data only in said temporary image data storing portion when said image data is stored therein; and processing said necessary image data both in said temporary image data storing portion and said image data storing portion when said image data is not stored in said temporary image data storing portion.

8. An image processing method according to claim 7, further comprising the steps of:

locating also a block area in which said necessary image data is stored by decoding an address data; and investigating whether said necessary image data is stored in said temporary image data storing portion or not based on a located block area.

* * * * *